July 7, 1953 F. K. KRAG 2,644,690

TAPE GUIDE, AND PRESSER FOR TAPE RECORDERS AND THE LIKE

Filed Dec. 26, 1951

Inventor:
Franz K. Krag,
by Thos. A. ... Atty.

Patented July 7, 1953 2,644,690

UNITED STATES PATENT OFFICE 2,644,690

TAPE GUIDE AND PRESSER FOR TAPE RECORDERS AND THE LIKE

Franz K. Krag, Chicago, Ill.

Application December 26, 1951, Serial No. 263,261

3 Claims. (Cl. 274—4)

This invention relates to improvements in tape-guides and pressers for tape-recorders, and the like. The device herein disclosed has been designed especially to meet the conditions existing in tape-recorders and like translators, for which reason I shall first state certain of the operating conditions imposed in the operation of such translators.

The tape-recorder is provided with a sensing head which includes magnetic sensing elements to receive and magnetically translate the varying magnetic signals carried by the tape passing before such head. Generally these sensing elements include one or more small magnetic pole pieces which are exposed to the varying magnetic influences of the magnetized tape surface passing rapidly before such pole pieces. Suitable electromagnetic elements are provided in conjunction with the pole pieces so that the varying magnetic intensity existing on the magnetized surface of the tape is translated into suitable varying electric currents which in turn are amplified and otherwise used for producing the desired sound effects or otherwise. It is also conventional practice to provide such sensing heads with magnetic pole pieces which may be magnetized from outside sources to produce sufficiently powerful magnetic effects to "erase" any previously magnetized effects carried by the tape, so that said tape may then be re-used to receive a new set of signals, to be thereafter translated according to the principles previously stated herein. Thus it is common practice to provide the sensing heads with two magnetic poles for the stated purposes. These two pole pieces, when provided, lie side by side in the sensing head but separated sufficiently to ensure good and faithful operations independently of each other and at different times.

The tape used in these operations is of suitable material to carry the deposit of magnetizable, finely comminuted material such as an iron oxide or the like in a very thin film. The tape is of sufficient strength to meet the tension requirements to which it is subjected during use, and at the same time is of sufficient flexibility to be readily rolled onto and from reels of acceptable size without cracking or otherwise impairing the tape itself or the deposit of magnetizable material on its surface. This magnetizable surface is magnetized during the receiving operation so that the strength and spacing of the magnetism along the tape surfaces varies faithfully according to the varying frequencies and amplitudes of the signals being received on the tape; and thereafter, when such magnetized tape is run through another translating machine these magnetic signals must transfer their effects faithfully to the receiving magnetic pole of the sensing head.

Due to the extreme delicacy of the magnetic variations and frequencies along the tape it is evident that faithful recording and reproduction of such magnetic signals requires that the tape be very accurately guided and held in place with respect to the sensing head during these operations. In order that the magnetic effects shall be translated to the maximum values, it is desirable that the magnetized surface of the tape be at all times held in good surface contact with the magnetic pole of the sensing head, but without too great pressure between the surface and the pole. Good contact is desirable for it is well known that the magnetic reluctance of a path varies directly as the length of such path, and even a very small air gap between the tape surface and the pole piece will seriously reduce the translating ability. On the other hand, too much pressure will cause scratches to be produced on the magnetized tape surface, thus impairing its future value, and also interfering with the faithfulness of the translation then being made.

It is a prime object of the present invention to make provision for securing a pressure against the tape surface and the magnetized pole under slight spring pressure which is yieldable so that during the travel of the tape slight inequalities in thicknesses may be accommodated, while at the same time ensuring maintenance of the desired slight pressure. In this connection it is a further object to exert the actual contact of the spring pressed guide element with the tape surface through the medium of a soft and yieldable body such as a body or block of fine felt or the like which shall come into direct contact with the tape surface.

When the tape is to be "threaded" into the recorder, or is to be removed therefrom such tape must be set into place in the tape guide with facility and without danger of scratching or otherwise damaging the tape itself. It is a further feature and object of the present invention that I have provided means whereby the tape guide as an entity may be moved towards or away from the sensing head during such operations as just referred to. When this tape guide is moved back away from the sensing head there is provided a sufficient space or clearance to accommodate the insertion or removal of the tape; and when thereafter the tape guide is moved back into its operating position the tape will be brought into and maintained in proper contact with the sensing head. In a certain construction of tape recorder with which the present tape guide is readily usable, means are provided for causing these bodily movements of the tape guide towards and away from the sensing head. These movements are of a predetermined amount, and serve to bring the frame of the tape guide to a definite position with respect to the sensing head. Before completion of such definite movement the spring yieldable means heretofore mentioned brings the tape into actual contact with the sensing head, so that the final small additional movement of such means serves merely to slightly increase the actual pressure of the tape against the magnetic pole, but under spring yield.

It is a further object of the invention to provide a shoe or shoes comprising a portion of the tape guide and carried by its lower portion in position to receive and support the lower edge of the tape during insertion or removal of the tape with respect to the sensing head. These shoes serve at all times to span the gap between the spring pressed element of the tape guide and the sensing head, so that at no time can the tape move to a position lower than that which it should occupy during the translating operations. These shoes serve to retain the tape at the correct elevation with respect to the sensing head when the spring pressed element is retracted from the sensing head, and also serve to ensure correct alignment of the tape with the sensing head during all normal translating operations.

A further feature and object of the invention is to provide a design and construction of the two main parts of the tape guide such that said parts may be produced from sheet metal, by simple forming operations, and at very low cost, but within close tolerances.

Other objects and uses of the invention will appear from a detailed description of the same, which consists in the features of construction and combinations of parts hereinafter described and claimed.

In the drawing:

Figure 4 shows a front elevation of the sensing head, and it shows the two magnetic pole pieces already referred to;

Figure 1:
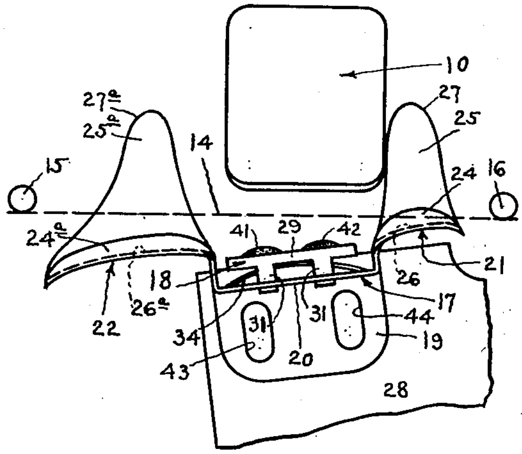
Figure 1 shows a plan view of the tape guide and the sensing head, on enlarged scale, the tape guide being shown in its rearwardly moved position in which the presser shoe is free of the tape itself.

In the figures I have shown the sensing head schematically at 10. It is substantially rectangular, being provided with the front face 11 through which are exposed the two magnetic pole pieces 12 and 13. In the form shown the pole piece 12 is for interpretations, and the pole piece 13 is for "erasing" operations, but of course this arrangement might be reversed, as far as the present invention is concerned. These pole pieces are, however, separated horizontally sufficiently so that their magnetic effects are not confused. The tape is shown schematically by the dash line 14 extending past the sensing head. This tape is drawn by a reel at the right hand side of the device and winds thereon, or is drawn by a suitable pulling spindle and delivered to such reel; and during this operation the tape is surrendered from another reel at the left-hand side of the device. These reels, and spindle, are not shown as they are not a portion of the present invention, except insofar as they ensure travel of the tape past the sensing head. When the direction of tape travel is reversed, by drawing the tape towards the left, winding it on the left hand reel and drawing it from the right hand reel, no sensing is needed, and the tape may be allowed to run free, and without contact with the sensing head.

In Figure 1 the tape is shown as passing over the two studs or pins 15 and 16 located at the sides of the device, and these studs are so positioned that during free travel of the tape, as shown in Figure 1, said tape lies forwardly of the sensing head and not in contact therewith. Thus, the normal condition of the tape is one in which it is free of the sensing head and out of contact therewith.

Figure 2:
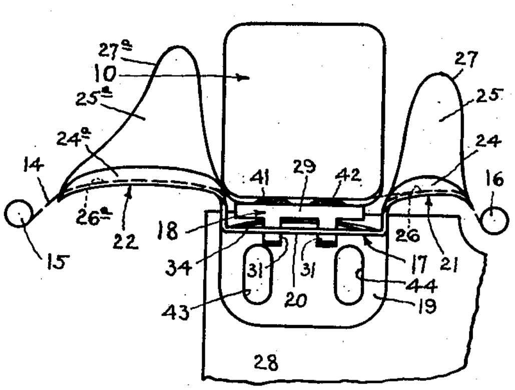
Figure 2 shows a plan view similar to that of Figure 1 but with the tape guide moved forward into its working position with the tape pressed against the sensing head.
Figure 5:
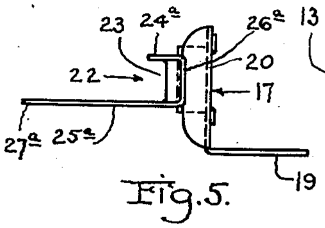
Figure 5 shows a left-hand edge view corresponding to Figures 1, 2 and 3.
Figure 4:
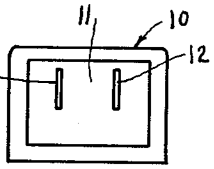
Figure 3:
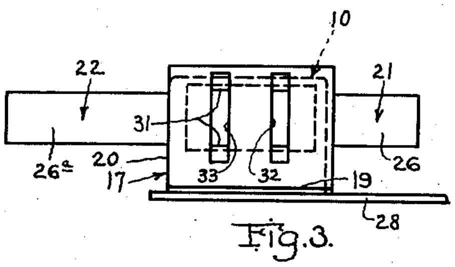
Figure 3 shows a front elevation corresponding to Figures 1 and 2.
Figure 6:
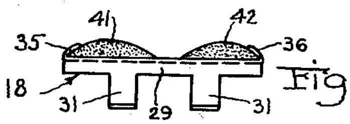
Figure 6 shows a plan view of the presser head of the tape guide, on still greater scale than Figures 1 to 5, inclusive.

I have provided the tape guide for pressing the tape into contact with the sensing head, and for guiding the tape in its travels in either direction past the sensing head, either when the tape is in contact with the sensing head or is running free thereof. This tape guide includes the body or frame element, generally designated by the numeral 17, and the presser shoe or head, 18. The body element includes a foot or pedestal 19 which may be secured to a suitable carrier, a vertical wall 20 which extends upwardly from the front edge of this pedestal, and the right and left hand wings 21 and 22 which are carried by the wall 20 and reach outwardly to the right and to the left, at the elevation at which the tape is to travel. These wings are conveniently formed as lateral extensions of the right and left hand edges of the wall 20. Each of these wings is of such form as to provide the forwardly facing channel, such as shown at 23 in Figure 5, which channel is of vertical dimension to receive the tape when said tape lies in a vertical plane, and the upper and lower edges of the tape are guided by the upper and lower flanges 24 and 25 (and $24^a$ and $25^a$) of these channels. These two wings are of lateral dimension sufficient to give good support and guidance to the travelling tape as it moves past the sensing head; and as shown in Figures 1 and 2 the left hand wing, 22, is preferably of greater lateral dimension than the right hand wing, 21. Furthermore, the webs of both of these wings, shown at 26 and $26^a$, are nicely curved so that the entering and retreating lengths of tape will not encounter any sharp edges or sudden changes of direction of travel.

From the lower flanges 25 and 25[a] of the two wings there extend forwardly the lugs 27 and 27[a] for considerable distances, so that even when the tape guide is moved into its non-operative position of Figure 1 both of these lugs extend to positions laterally of the sensing head, and thus it is impossible for the tape to extend past the sensing head at any time without overlying these two lugs. Thus, when inserting or removing tape, and with the tape guide moved back into the position of Figure 1, the tape will be supported with its lower edge lying on these two lugs. Then, as the tape guide is moved towards the sensing head the tape will be retained in its correct elevational position with respect to the sensing head. Likewise, when the tape guide is moved back into the position of Figure 1 for such operations as "advancing" the tape without translation operations, the tape will be properly supported by these lugs during its travel past the sensing head. This will also be true of rewinding operations in which the tape is being moved from right to left but without engagement of the tape with the sensing head. Thus, for all conditions of operations to be performed with tape movements, these lugs will retain the tape in its correct elevational position.

In the installation of the tape guide into a recorder the pedestal 19 is secured to a suitable supporting element, as already mentioned. In the drawing such supporting element is shown as comprising the plate 28 (only a portion of which is shown), and which plate is pivotally mounted so that it may be rocked about a vertical pivot located to the right of the tape guide. Means are provided in the recorder for rocking this element 28 forwardly, into position to carry the tape guide into its working position, or rearwardly, to carry the tape guide into the position of Figure 1. During this rocking movement the tape guide will execute some angularity, as between its two positions, Figures 1 and 2, but when finally the working position is substantially reached the wall 20 will stand substantially parallel to the front 11 of the sensing head. Then, during backward rock the angularity of movement will bring the tape guide into the position of Figure 1. The two lugs 27 and 27[a] (and other portions of the tape guide) are so formed that during these rocking movements no improper interference will occur between the parts.

I have provided a presser shoe or head 18 already referred to. This element is carried by the wall 20 of the body element in such manner that it is normally spring projected forwardly of the wall 20 to a limited position, and when said shoe comes into engagement with the face of the tape the shoe will be arrested, and further slight forward movement of the body of the tape guide (including the wall 20) will serve to ensure pressure of the shoe against the tape under slight spring pressure. To these ends the following constructions are shown:

The shoe element 18 is formed of a sheet metal blank formed to provide a channel having the upper and lower flanges 29 and 30 which extend across the width of the wall 20 between the wings 21 and 22, but with slight clearances as shown in Figures 1 and 2. This channel is also provided with the rearwardly extending lugs 31 which extend through the vertical slots 32 and 33 formed in the wall 20, and the ends of these lugs are bent over at right angles at the rear face of the wall 20. Thus these lugs serve to hold the channel element in place with respect to the wall, while also allowing it to move forwardly and backwardly with respect to the wall, and the bent over ends of the lugs prevent complete disengagement of the channel from the wall. A light leaf spring 34 is placed between this channel and the front face of the wall 20, the ends of this spring bearing against the wall at points close to the wings 21 and 22, and the central portion of the spring bearing against the central portion of the channel. Thus said channel is always projected forwardly by the light spring, and at the same time said channel is permitted rocking movement on the spring so that the channel and any bearing elements carried thereby for engagement with the tape may come to a smooth and even bearing against the tape.

Figure 7:
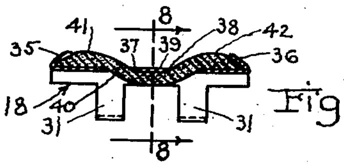
Figure 7 shows a central horizontal section through the presser head, being a section on the line 7—7 of Figure 8, looking the direction of the arrows.
Figure 8:
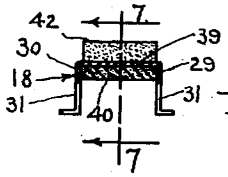
Figure 8 shows a cross-section through the presser head, being a section taken on the line 8—8 of Figure 7, looking in the direction of the arrows.
Figure 9:
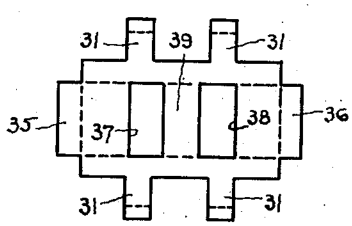
Figure 9 shows a sheet metal blank which may be formed into the presser head of Figures 6, 7 and 8.

This channel is provided with the end ears 35 and 36 and with the cross-wise extending slots 37 and 38, as well shown by the form of the blank shown in Figure 9. When this blank has been formed into the channel form these slots extend across the channel, leaving the cross-bar 39 at the center of the channel. A strip of thin soft material, such as fine felt or the like, 40 is threaded back and forth through these slots in the manner well shown in Figure 7, so that the two soft bearing surfaces 41 and 42 are exposed at the front face of the channel; and then the ears 35 and 36 are folded firmly down against the ends of the strip of material to hold them permanently in place. Thus, there are provided the two bearing surfaces of soft compressible material; and by properly proportioning the parts these two bearing surfaces will properly align with the two pole pieces of the sensing head when the tape guide is brought into its operative position, shown in Figure 2. As the tape guide is thus moved towards the sensing head these bearing surfaces will come against the surface of the tape, and slight further movement of the body element 17 of the tape guide will merely serve to compress the spring 34 to place the desired degree of pressure on the tape; but this will occur without actual contact of the wall 20 with the floor of the channel, or without complete compression of the leaf spring. Thus the engagement of the tape with the sensing head will always be effected under spring pressure. The pedestal element 19 is shown as provided with the slots 43 and 44 to receive holding screws extending into the rocking element 28, so that by proper adjustment the parts may be brought into such conditions that the foregoing relationship will occur, notwithstanding that the rocking element will be moved to a definite limit of stoppage forwardly in its movement.

I claim:

1. A tape guide for guiding a record tape during the travel of said tape past a sensing head and for retaining the tape in light and smooth pressing contact with the sensing head, said guide including a first unit comprising a sheet metal blank formed to provide a vertical plane surfaced body member provided with a pair of vertical through slots which are laterally separated from each other, a pedestal extending rearwardly from said body member at right angles to the body member, and laterally extending wings reaching from both sides of the said body member, each wing including a vertical tape guiding flange reaching laterally from the proximate portion of the said vertical body member and a forwardly reaching substantially horizontal prong in connection with the lower edge of each flange, both of the vertical flanges being formed on curved surfaces which are concave rearwardly and which surfaces are developed by movement of vertical straight lines laterally away from the body member, together with a second unit comprising a presser shoe formed from a sheet metal blank to provide a body member of channel shaped cross-section and including upper and lower rearwardly reaching flanges, said body member being of size to be accommodated directly in front of the vertical plane surfaced body member of the first unit and with the channel of the presser shoe extending horizontally and the flanges of said channel reaching rearwardly towards the body member of the first unit, lugs on both of said channel flanges reaching rearwardly through the slots of the body member of the first unit, a bow shaped leaf spring accommodated within the channel of the presser shoe and having its end portions in contact with the front face of the vertical body member of the first unit and having its central bowed portion in contact with the central portion of the rear face of the presser shoe to urge said presser shoe forwardly with respect to the first unit, stops on the rear ends of the lugs of the presser shoe channel flanges to engage the rear face of the body member of the first unit and limit forward movement of the presser shoe under the urging of said spring, together with a yieldable pad connected to the presser shoe and located at the front face of said shoe.

2. Means as specified in claim 1 wherein the body member of the second unit is provided with two through slots extending at right angles to the channel flanges, and a strip of yieldable material extended along the presser shoe from end to end of the shoe, said strip lying against the front face of the two end portions of the shoe, and extending through both of the slots and lying against the back face of the presser shoe between said slots.

3. Means as specified in claim 2, together with means to secure each end of said strip to the proximate end of the body of the shoe.

FRANZ K. KRAG.

References Cited in the file of this patent

UNITED STATES PATENTS

| Number | Name | Date |
|---|---|---|
| 2,538,893 | Begun | Jan. 23, 1951 |
| 2,595,197 | Kuhlow | Apr. 29, 1952 |